(12) United States Patent
Chan et al.

(10) Patent No.: US 8,346,710 B2
(45) Date of Patent: Jan. 1, 2013

(54) EVALUATING STATISTICAL SIGNIFICANCE OF TEST STATISTICS USING PLACEBO ACTIONS

(75) Inventors: David Xi-Kuan Chan, Edgewater, NJ (US); Rong Ge, Sammamish, WA (US); Ori Gershony, Redmond, WA (US); Tim Hesterberg, Seattle, WA (US); Diane Lambert, Berkeley Heights, NJ (US)

(73) Assignee: Google Inc., Mountain View, CA (US)

( * ) Notice: Subject to any disclaimer, the term of this patent is extended or adjusted under 35 U.S.C. 154(b) by 517 days.

(21) Appl. No.: 12/696,921

(22) Filed: Jan. 29, 2010

(65) Prior Publication Data

US 2011/0191282 A1 Aug. 4, 2011

(51) Int. Cl.
*G06F 9/44* (2006.01)
*G06N 7/02* (2006.01)
*G06N 7/06* (2006.01)

(52) U.S. Cl. ........................................................ 706/52
(58) Field of Classification Search ....................... 706/52
See application file for complete search history.

(56) References Cited

U.S. PATENT DOCUMENTS

| | | | | |
|---|---|---|---|---|
| 6,810,517 B2* | 10/2004 | Bond et al. | ...................... | 717/138 |
| 6,820,090 B2* | 11/2004 | Chambers et al. | ...................... | 1/1 |
| 6,904,409 B1* | 6/2005 | Lambert et al. | ............... | 705/7.33 |
| 6,915,271 B1 | 7/2005 | Meyer et al. | | |
| 7,016,806 B2* | 3/2006 | Lambert et al. | ............... | 702/181 |
| 7,373,311 B2* | 5/2008 | Lambert et al. | ............... | 705/7.33 |
| 7,406,434 B1 | 7/2008 | Chang et al. | | |
| 7,415,423 B2 | 8/2008 | Ranka et al. | | |
| 7,756,740 B2* | 7/2010 | Lambert et al. | ............... | 705/7.33 |
| 7,987,457 B2* | 7/2011 | Biswas et al. | ................. | 717/145 |
| 8,090,703 B1* | 1/2012 | Agarwal et al. | ............... | 707/707 |
| 2002/0032581 A1 | 3/2002 | Reitberg | | |
| 2003/0088365 A1 | 5/2003 | Becker | | |
| 2003/0125609 A1 | 7/2003 | Becker | | |
| 2005/0159921 A1 | 7/2005 | Louviere et al. | | |
| 2005/0160002 A1 | 7/2005 | Roetter et al. | | |
| 2007/0156382 A1 | 7/2007 | Graham et al. | | |
| 2008/0253665 A1 | 10/2008 | Mitarai et al. | | |
| 2009/0012927 A1 | 1/2009 | Brooks et al. | | |
| 2009/0210371 A1 | 8/2009 | Laan | | |

OTHER PUBLICATIONS

International Preliminary Report on Patentability in PCT/US2011/022747 mailed Aug. 9, 2012, 7 pages.
Paul R. Rosenbaum, "Observational Studies", 2002, Second Edition, Springer Series in Statistics.

(Continued)

*Primary Examiner* — Michael B Holmes
(74) *Attorney, Agent, or Firm* — Fish & Richardson P.C.

(57) ABSTRACT

Methods, systems, and apparatus, including computer programs encoded on computer storage media, for evaluating statistical significance using placebo actions. One method includes receiving exposure data and control data describing exposed and control subjects and determining a test statistic for each of a plurality of subject actions including a desired action and a plurality of placebo actions. The test statistic for an action corresponds to an estimated effect that exposure to the treatment has on a likelihood that a subject will take the action. The method further includes comparing the test statistic for the desired action to the test statistics for the plurality of placebo actions, and determining whether the test statistic for the desired action is statistically significant according to the comparison. Another method includes automatically identifying placebo actions using a taxonomy that classifies subject actions or treatments, and determining test statistics for the placebo actions.

40 Claims, 6 Drawing Sheets

OTHER PUBLICATIONS

U.S. Authorized Officer Lee W. Young, Notification of Transmittal of the International Search Report and the Written Opinion of the International Searching Authority, or the Declaration for Application No. PCT/US2011/022747, dated Mar. 30, 2011, 8 pages.

Baba Shiv et al., "Placebo Effects of Marketing Actions: Consumers May Get What They Pay for", Journal of Marketing Research, Nov. 2005, vol. XLII, pp. 383-393.

Caglar Irmak et al., "The Placebo Effects in Marketing: Sometimes You Just Have to Want it to Work", Journal of Marketing Research, Nov. 2005, vol. XLII, pp. 406-409.

Alberto Abadie, "Synthetic Control Methods for Comparative Case Studies: Estimating the Effect of California's Tobacco Control Program", Jun. 2010, Journal of the American Statistical Association, vol. 105, No. 490, Application and Case Studies, pp. 493-505.

"Brand Metrix, Measure the Attitudinal and View Thru Impact of Your Online Advertising", comScore, Inc., [retrieved on Dec. 2, 2009]. Retrieved from the Internet: <URL: <http://www.comscore.com/Products Services/Product Index/Brand Metrix>, 2 pages.

"Campaign Metrix, Validate the Performance of Your Online Advertising Campaigns", comScore, Inc., [retrieved on Dec. 2, 2009]. Retrieved from the Internet: <URL: <http://www.comscore.com/Products Services/Product Index/Campaign Metrix>, 2 pages.

Donald B. Rubin, Estimating Causal Effects of Treatments in Randomized and Nonrandomized Studies, 1974, Journal of Educational Psychology, vol. 66, No. 5, pp. 688-701.

Donald B. Rubin et al., Estimating the Causal Effects of Marketing Interventions Using Propensity Score Methodology, 2006, Statistical Science, vol. 21, No. 2, pp. 206-222.

D.G. Horvitz et al., "A Generalization of Sampling Without Replacement from a Finite Universe", 1952, Journal Paper No. J2139 of the Iowa Agricultural Experiment Station, Ames, Iowa, Project 1005, Presented to the Institute of the Mathematical Statistics, pp. 663-685.

Daniel F McCaffrey et al., Propensity Score Estimation with Boosted Regression for Evaluating Causal Effects in Observational Studies, 2004, Psychological Methods, vol. 9, No. 4, pp. 403-425.

Gian M. Fulgoni et al., "How Online Advertising Works: Whither the Click?", Dec. 4-5, 2008, 16 pages, http://www.comscore.com.

George M. Furnival et al., "Regression by Leaps and Bounds", Technometrics, Nov. 1974, vol. 16, No. 4, pp. 499-511.

Guido Imbens, "Nonparametric Estimation of Average Treatment Effects Under Exogeneity: A Review", Feb. 2004, The Review of Economics and Statistics, 86(1), pp. 4-29.

Greg Ridgeway et al., Doubly Robust Internal Benchmarking and False Discovery Rates for Detecting Racial Bias in Police Stops, Jun. 2009, Journal of the American Statistical Association, vol. 104, No. 486, pp. 661-668.

Heejung Bang et al., "Doubly Robust Estimation in Missing Data and Causal Inference Models", 2005, Biometrics, 61, pp. 962-972.

Jiayuan Huang et al., "Correcting Sample Selection Bias by Unlabeled Data", 2007, In Advances in Neural Information Processing Systems 19: Proceedings of the 2006 Conference, pp. 601-608.

Jerome Friedman et al., Regularization Paths of Generalized Linear Models via Coordinate Descent:, 2008, Stanford University Technical Report, pp. 1-22.

Jens Hainmueller, Synthetic Matching for Causal Effects: A Multivariate Reweighting Method to Produce Balanced Samples in Observational Studies, 2008 & 2010, Massachusetts Institute of Technology, 51 pages.

Jared K. Lunceford et al., "Stratification and Weighting via the Propensity Score in Estimation of Causal Treatment Effects: A Comparative Study", 2004, Statistics in Medicine, 23, pp. 2937-2960.

James M. Robins et al., "Analysis of Semiparametric Regression Models for Repeated Outcomes in the Presence of Missing Data", Mar. 1995, Journal of the American Statistical Association, vol. 90, No. 429, pp. 106-121.

Jeffrey M. Wooldridge, "Econometric Analysis of Cross-Section and Panel Data", 2002, MIT Press, pp. 603-642.

Keisuke Hirano et al., "Efficient Estimation of Average Treatment Effects Using the Estimated Propensity Score", Jul. 2003, Econometrica, vol. 71, No. 4, pp. 1661-1189.

"Measuring the digital world", comScore, Inc., [retrieved on Dec. 2, 2009]. Retrieved from the Internet: <URL: <http://comscore.com/>, 2 pages.

Nielsen, The Nielsen Company, [retrieved on Dec. 2, 2009]. Retrieved from the Internet: <URL: <http://www.nielsen.com/>, 1 page.

Paul R. Rosenbaum et al., The Central Role of the Propensity Score in Observational Studies for Causal Effects, 1983, Biometrika, vol. 70, No. 1, pp. 41-55.

Paul R. Rosenbaum et al., "Reducing Bias in Observational Studies Using Subclassification on the Propensity Score", Sep. 1984, Journal of the American Statistical Association, vol. 79, No. 387, pp. 516-524.

Richard Emsley et al., "Implementing double-robust estimators of causal effects", 2008, The Stata Journal, vol. 8, No. 3, pp. 343-353.

Roderick J. Little et al., Causal Effects in Clinical and Epidemiological Studies Via Potential Outcomes: Concepts and Analytical Approaches, 2000, Annual Review of Public Health, 21, pp. 121-145.

Base SAS® 9.1.3 Procedures Guide, 2006, SAS Online Documentation, Second Edition, SAS Institute, Inc., pp. 59-72.

Tim Hesterberg et al., "Least angle and L1 penalized regression: A review", 2008, Statistics Survey, vol. 2, pp. 61-93.

"We'll find that needle—but only if it's there", Target Analytics, [retrieved on Dec. 2, 2009]. Retrieved from the Internet: <URL: <http://www.targetanalytics.com/>, 3 pages.

\* cited by examiner

EVALUATING STATISTICAL SIGNIFICANCE OF TEST STATISTICS USING PLACEBO ACTIONS

BACKGROUND

This specification relates to determining the significance of test statistics. Researchers use experiments to test how subjects are changed by being exposed to various treatments. In general, a treatment is something that researchers expose subjects to in order to determine possible effects of the treatment. For example, in an experiment to determine the effect of a particular medication, a subject is exposed to the treatment if the subject takes the medication. As another example, in an experiment to determine the effect of listening to music by Mozart on student test scores, a student is exposed to the treatment if the student listens to music by Mozart. As yet another example, in an experiment to determine the effect of viewing an advertisement on user behavior, a user is exposed to the treatment if the user views the advertisement.

Different types of experiments can be used to estimate the effect of a treatment on subject behavior. Controlled experiments, in which a random proper subset of subjects are exposed to a treatment, can provide estimates of how being exposed to a treatment changes both short-term and long-term subject behavior. However, these experiments are often both expensive and impractical.

Observational studies are used as an alternative to controlled experiments. Observational studies compare exposed subjects, i.e., subjects who were exposed to a treatment, to control subjects, i.e., subjects who were not exposed to the treatment. Observational studies compare exposed and control subjects to estimate the effect the treatment has on particular actions monitored by the study. The effect is measured by generating action-specific models and using the models to generate test statistics that estimate the effect being exposed to a treatment has on a particular action of interest.

Once the test statistic for a particular action is generated, it is determined whether the effect indicated by the test statistic is due to being exposed to the treatment, or is due just to chance. A test statistic is statistically significant if the effect indicated by the statistic is due to more than just chance.

Statistical significance is generally determined by verifying or rejecting a null hypothesis. The null hypothesis states that any effect indicated by the test statistic is due to mere chance. Conventional methods for determining statistical significance verify or reject the null hypothesis by comparing the test statistic to a reference distribution, for example, a standard normal distribution. If the test statistic falls within an upper percentile of the distribution (for example, the top 5%), the null hypothesis is rejected, and the test statistic is determined to be statistically significant.

This significance test is sufficient when the model(s) used to generate the test statistic are adequate. However, the model(s) used to generate test statistics are often not complete. The model(s) are generated using only a proper subset of possible features of subjects. If a feature is correlated with both exposure to the treatment and the action being tested, but not used by the model(s) that generated the test statistic, then there can be hidden, residual selection bias in the model. This hidden, residual selection bias will result in a test statistic that is inaccurate. The hidden, residual selection bias will not be discovered using the conventional methods for determining statistical significance, and therefore a test statistic can be incorrectly determined to be statistically significant.

SUMMARY

In general, one aspect of the subject matter described in this specification can be embodied in methods that include the actions of receiving exposure data and control data, the exposure data describing exposed subjects and the control data describing control subjects, each of the exposed subjects being a subject that was exposed to a treatment, and each of the control subjects being a subject that was not exposed to the treatment, wherein the exposure data includes values for a plurality of features for each exposed subject, the plurality of features for each exposed subject including features describing actions taken by the exposed subject, and wherein the control data includes values for a plurality of features for each control subject, the plurality of features for each control subject including features describing actions taken by the control subject; determining, from the exposure data and the control data, a test statistic for each of a plurality of subject actions including a desired action and a plurality of placebo actions, wherein the desired action is an action that is hypothesized to be possibly affected by the treatment and each placebo action is an action that is hypothesized to be unaffected by the treatment, and wherein the test statistic for an action corresponds to an estimated effect that exposure to the treatment has on a likelihood that a subject will take the action; comparing the test statistic for the desired action to the test statistics for the plurality of placebo actions; and determining whether the test statistic for the desired action is statistically significant according to the comparison. Other embodiments of this aspect include corresponding systems, apparatus, and computer programs recorded on computer storage devices, each configured to perform the operations of the methods.

These and other embodiments can each optionally include one or more of the following features. Comparing the test statistic for the desired action to the test statistics for the plurality of placebo actions can include generating a probability score for the desired action, wherein the probability score estimates the probability that a test statistic randomly selected from a population corresponding to the test statistics for the placebo actions is greater than or equal to the test statistic for the desired action. The actions can further include determining whether the test statistic for the desired action is statistically significant according to the probability score. Calculating the probability score can include dividing a number of test statistics for the desired action and the placebo actions that are greater than or equal to the test statistic for the desired action by a total number of test statistics for the desired action and the placebo actions. Calculating the probability score can include interpolating between a first probability score for a test statistic for a placebo action that is less than the test statistic for the desired action and a second probability score for a test statistic for a placebo action that is greater than the test statistic for the desired action. The actions can further include transforming the first probability score and the second probability score to a reference distribution scale before performing the interpolation. The reference distribution scale can be a normal distribution scale. Calculating the probability score can include fitting a statistical distribution to the test statistics for the placebo actions and calculating the probability score from the fitted distribution.

Determining whether the test statistic for the desired action is statistically significant according to the probability score can include comparing the probability score to a threshold. The threshold can be derived from a specified acceptable false alarm rate.

A test statistic for an action can be the estimated increase in the action caused by the treatment divided by the standard error of the estimated increase. The treatment can be being exposed to an advertisement in an advertising campaign of an advertiser. The desired action can be one of a navigation to a web page associated with the advertiser, a submission of a search query including a search term associated with the advertiser, and an action identified by the advertiser as a conversion. The desired action can be an offline action. The actions can further include selecting the plurality of placebo actions from a plurality of candidate actions.

In general, another aspect of the subject matter described in this specification can be embodied in methods that include the actions of receiving exposure data and control data, the exposure data describing exposed subjects and the control data describing control subjects, each of the exposed subjects being a subject that was exposed to a first treatment, and each of the control subjects being a subject that was not exposed to the first treatment, wherein the exposure data includes values for a plurality of features for each exposed subject, the plurality of features for each exposed subject including features describing actions taken by the exposed subject, and wherein the control data includes values for a plurality of features for each control subject, the plurality of features for each control subject including features describing actions taken by the control subject; automatically identifying, with the data processing apparatus, a plurality of placebo actions for the first treatment, wherein each placebo action is an action that is hypothesized to be unaffected by the first treatment, wherein the identifying includes using a taxonomy that classifies one or more of subject actions and treatments; and determining, with the data processing apparatus, from the exposure data and the control data, a test statistic for each of a plurality of subject actions including a desired action and the plurality of placebo actions, wherein the desired action is an action that is hypothesized to be possibly affected by the first treatment, and wherein the test statistic for an action corresponds to an estimated effect that exposure to the first treatment has on a likelihood that a subject will take the action. Other embodiments of this aspect include corresponding systems, apparatus, and computer programs recorded on computer storage devices, each configured to perform the operations of the methods.

These and other embodiments can each optionally include one or more of the following features. The taxonomy can classify subject actions, and automatically identifying a plurality of placebo actions can include selecting subject actions that have a different classification than the desired action according to the taxonomy. The placebo actions can be selected at random from actions that have a different classification than the desired action according to the taxonomy. The taxonomy can classify treatments, and automatically identifying a plurality of placebo actions can include selecting actions associated with treatments that have a different classification than the first treatment according to the taxonomy, wherein the actions associated with the treatments are actions that are hypothesized to be possibly affected by the treatments. The placebo treatments can be selected at random from treatments that have a different classification than the first treatment according to the taxonomy.

The actions can further include filtering out one or more of the identified placebo actions before determining the test statistics for the placebo actions. Identifying the plurality of placebo actions can include applying a machine-learning trained classifier to a plurality of candidate actions, wherein the machine-learning trained classifier classifies a candidate action as a placebo action or as not a placebo action for the first treatment based, at least in part, on one or more of a classification of the desired action according to the taxonomy and a classification of the first treatment according to the taxonomy. The actions can further include training the classifier using training data identifying a plurality of first actions that should be selected as placebo actions for each of one or more treatments and a plurality of second actions that should not be selected as placebo actions for each of one or more treatments. The training data can be data resulting from human analysis of treatments and actions. The training data can be data resulting from prior studies. The classifier can be specific to one of a source of the first treatment, a classification of the first treatment, or a classification of the source of the first treatment.

Particular embodiments of the subject matter described in this specification can be implemented so as to realize one or more of the following advantages. The statistical significance of a test statistic for a desired action can be more accurately determined. The effect of hidden, residual selection bias can be minimized. More accurate analysis of advertising campaigns can be generated and provided to advertisers. Estimates of the change in user behavior can be used as test statistics, without first converting the estimates to fit a standard reference distribution, because estimates are compared to other estimates on the same scale. Statistical tests presented in terms of placebo actions can be easier for non-statisticians to correctly interpret. Placebo actions can be automatically generated.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

§1.0 Example Observational Analysis System

Figure 1:
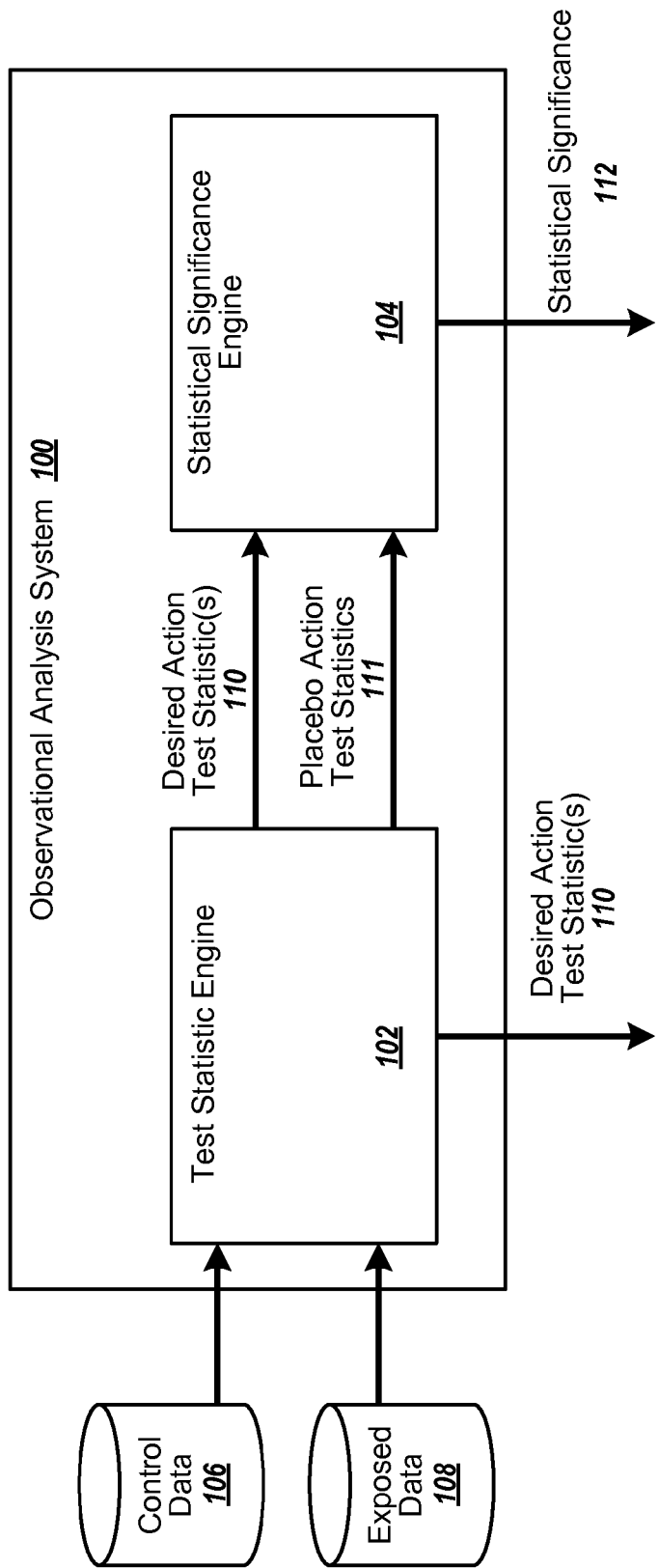
FIG. 1 is a block diagram of an example observational analysis system.

FIG. 1 is a block diagram of an example observational analysis system 100 that generates test statistics for one or more desired actions from experiment data and determines whether the test statistic for each desired action is statistically significant. The observational analysis system 100 is implemented as software executing on one or more computers.

The observational analysis system 100 includes a test statistic engine 102 and a statistical significance engine 104. The test statistic engine 102 receives control data 106 and exposed data 108 from an experiment. The control data 106 is data for control subjects who were not exposed to the treatment being tested by the experiment, and the exposed data 108 is data for exposed subjects who were exposed to the treatment being tested by the experiment. The control data 106 and the exposed data 108 identify features of the control and exposed subjects, respectively.

These features include, for example, characteristics of the subjects and actions taken by the subjects, as well as whether the subjects were exposed to the treatment, and if so, details on the exposure, for example, the amount of exposure, the location of the exposure, and the time of the exposure. The characteristics of the subjects describe the subjects, and can be selected depending on the type of experiment to identify characteristics that might predispose users to particular actions or to identify characteristics that distinguish users. For example, if the experiment is testing a new medication, the characteristics can describe the underlying health of a subject. As another example, if the experiment is testing the effectiveness of an online advertisement, the characteristics can describe Internet surfing behavior of a subject. The actions are actions taken by the subject (either voluntarily or involuntarily). These can include improvements in health, e.g., for a medication experiment, or particular web sites visited, e.g., for an online advertising experiment.

The actions can include both desired actions and placebo actions. A desired action is an action that is hypothesized to be possibly affected by the treatment. For example, if the treatment is exposure to a particular advertisement, a desired action can be that a subject views the home page of the advertiser or searches for brand terms of the advertiser. As another example, if the treatment is exposure to a particular medication, a desired action can be that a sick subject's symptoms decrease.

A placebo action is an action that is hypothesized to not be affected by the treatment. For example, if the experiment is testing the effect listening to Mozart has on subjects' test scores, an example placebo action is eating a piece of chocolate cake. As another example, if the experiment is testing an advertisement for a pizza parlor, an example placebo action is navigating to a website for a pickup truck.

The test statistic engine 102 receives the control data 106 and the exposed data 108 and generates one or more estimates for each action in the data that estimate the effect that a particular treatment has on a particular action. The test statistic engine 102 then derives a test statistic for each of one or more of the actions included in the data from the estimates. The test statistics include desired action test statistics 110 and placebo action test statistics 111, corresponding to the different types of actions. Example estimates include delta, i.e., the estimated increase in likelihood that a subject will take an action as a result of being exposed to a treatment, and lift, i.e., delta divided by the likelihood that a subject would take an action without being exposed to the treatment. The test statistics can be the estimates themselves, or a value derived from the estimates, for example, delta divided by the estimated standard error of delta.

In some implementations, the test statistic engine 102 generates the desired action test statistics 110 and the placebo action test statistics 111 using a separate statistical model for each action. Conventional statistical model generation techniques can be used to generate the models, and conventional techniques can be used to apply the models to generate the test statistics. Example models and techniques for generating test statistics are described in more detail below, with reference to FIG. 4.

Once the test statistic engine generates the desired action test statistics 110 and the placebo action test statistics 111, the statistical significance engine 104 analyzes the test statistics for the desired actions 110 and the placebo actions 111 to determine the statistical significance of the test statistic for each desired action. An example process for performing this analysis is described in more detail below, with reference to FIG. 4.

The system 100 can be used to determine test statistics, and the statistical significance of test statistics, from various types of observational experiments, including, for example, medical experiments, behavioral experiments, economic experiments, and advertising experiments. For illustrative purposes, an example advertising observational framework that uses a system like system 100 is described below in §2.0. However, the system 100 can be used in a variety of frameworks in addition to the framework described in §2.0.

§2.0 Example Advertising Observational Framework

Figure 2:
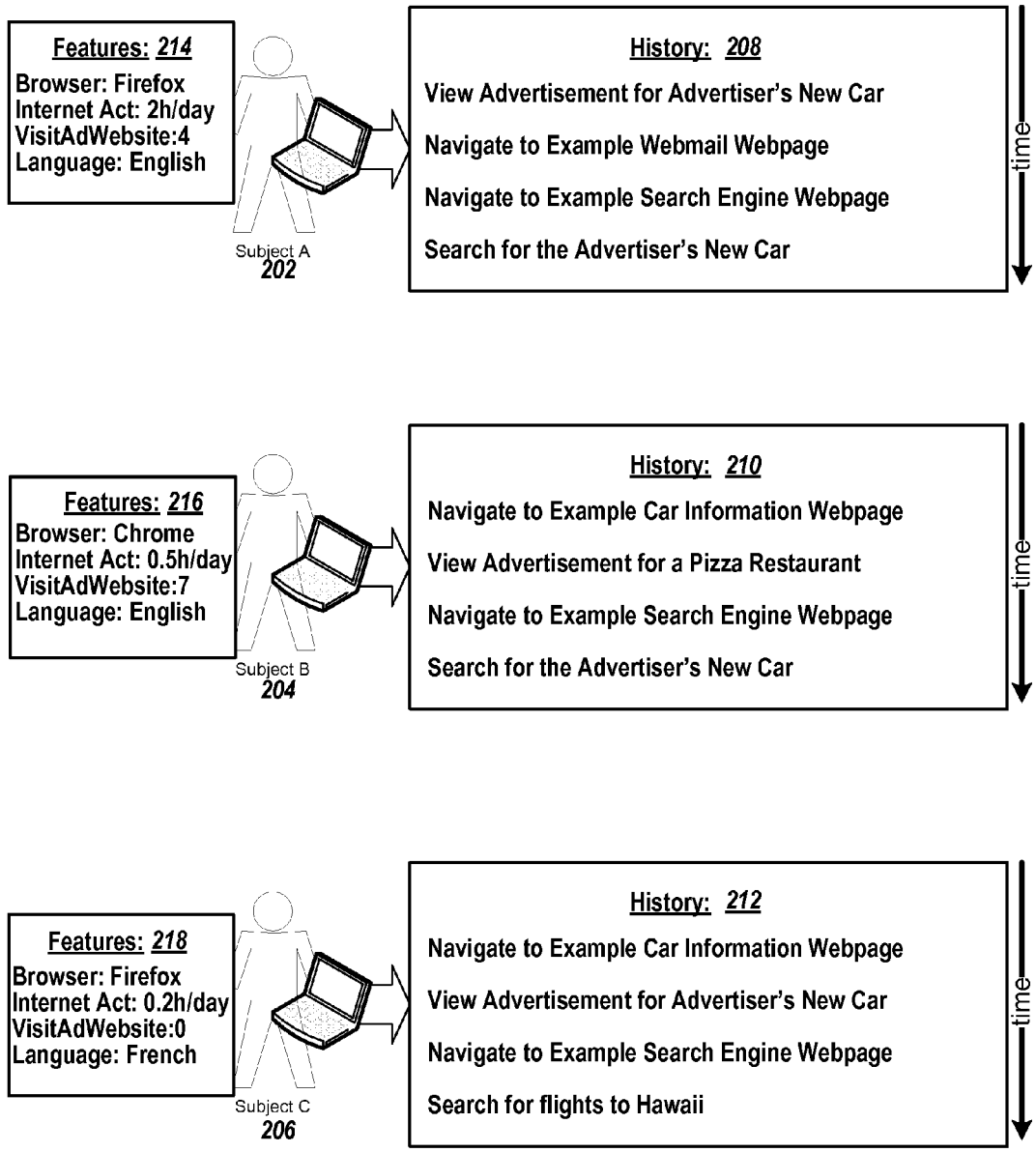
FIG. 2 illustrates example portions of histories of actions taken by test subjects.
Figure 3:
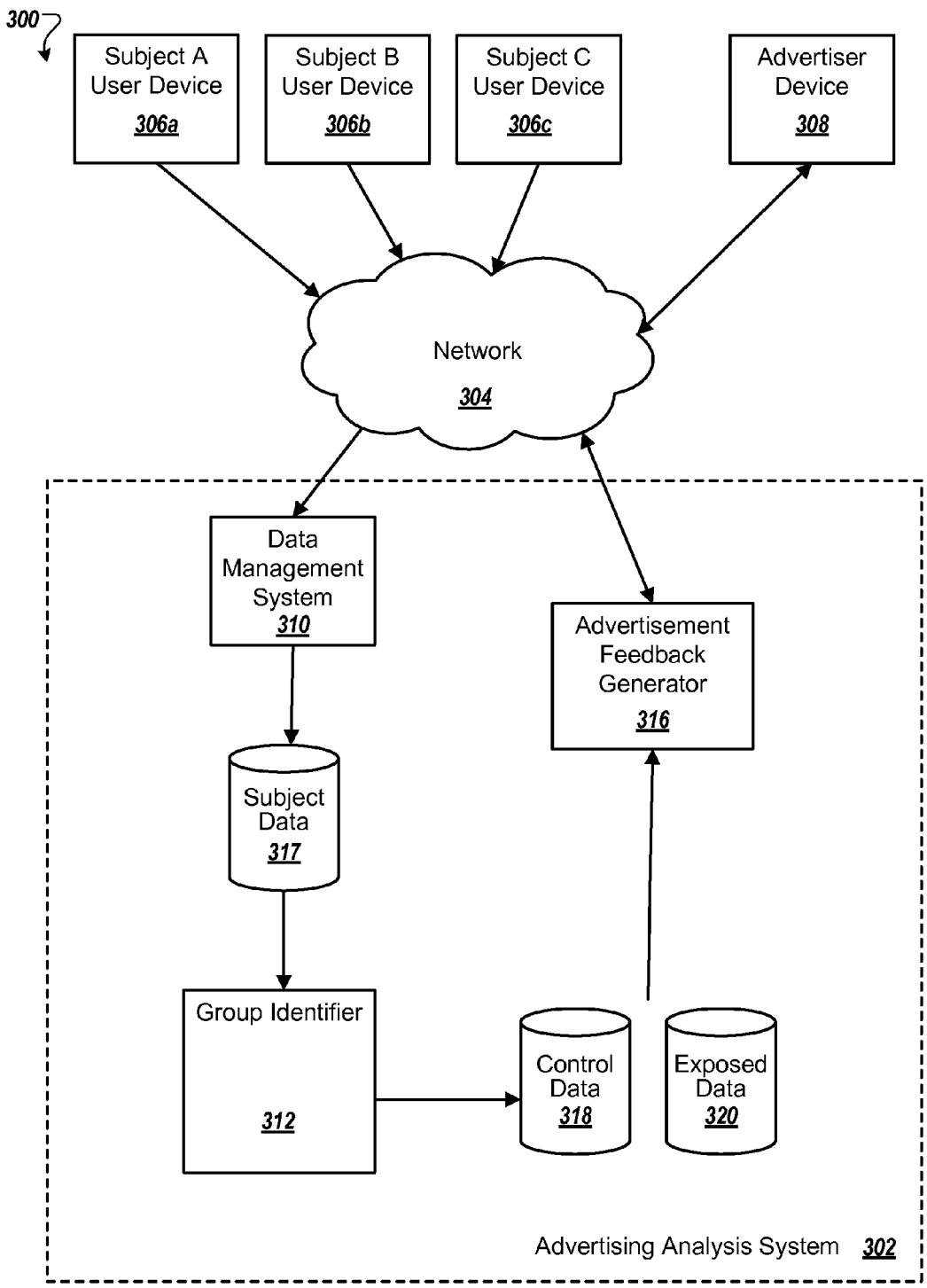
FIG. 3 is a block diagram of an example environment in which observational analysis of the effect of advertisements is performed by an advertising analysis system.

FIGS. 2 and 3 describe an example observational framework for testing the effect that advertisements, particularly online advertisements, have on subjects' Internet surfing behavior. In the example described below with reference to FIGS. 2 and 3, the treatment to which subjects are exposed is an advertisement associated with an advertising campaign of an advertiser and the desired actions are actions that the advertiser hopes to induce by exposing the subject to the advertisements in the advertising campaign.

§2.1 Example Subject Actions

FIG. 2 illustrates example portions of histories of actions taken by Subject A 202, Subject B 204, and Subject C 206. Each history portion describes advertisements the subjects viewed, websites the subject visited, and searches the subject initiated. Each subject can have additional history that is not shown. For example, the subjects can be exposed to multiple advertisements, navigate to multiple web sites, and perform multiple web searches in addition to the history shown.

When advertisers pay to place advertisements, the advertisers often want to know how successful the advertisements are, for example, as measured by subsequent subject actions. Specifically, an advertiser may be interested in whether being exposed to an advertisement causes the subject to take a desired action. Examples of desired actions include actions indicating interest in the advertiser's brand, for example navigating to a website of an advertiser, searching for particular terms that are relevant to the advertiser's brand, taking actions identified by the advertiser as a conversion, for example, purchasing a product that is advertised by the brand online. Desired actions can also include offline actions. An offline action is an action taken by a user somewhere other than on the Internet. An example offline action is purchasing the product advertised by the advertiser from a physical store.

For example, an advertiser may want to know whether viewing an advertisement for the advertiser's new car causes subjects to later search for the advertiser's new car. The history 208 for Subject A 202 indicates that Subject A 202 was exposed to an advertisement for an advertiser's new car, then navigated to a webmail website, then navigated to a search engine website, and then performed a search for the advertiser's new car. Similarly, the history 210 for Subject B 204 indicates that Subject B 204 navigated to a car review website, was exposed to advertisement for a pizza restaurant (not an advertisement for the advertiser's new car), navigated to a search engine website, and then performed a search for the advertiser's new car. The history 212 for Subject C 206 indicates that Subject C 206 also navigated to a car review website, was exposed to an advertisement for the advertiser's new car, then navigated to a search engine website, and then entered a search for flights to Hawaii (and did not search for the advertiser's new car). The actions of any one of the subjects do not indicate a clear pattern. For example, Subject A 202 viewed the advertisement and then searched for the car, Subject B 204 did not view the advertisement, but still searched for the car, and Subject C 206 viewed the advertisement, but did not search for the car.

Because the same subject is never both exposed to an advertisement and not exposed to an advertisement, an analysis system, such as the system 302 described below, estimates the effect of exposure on subject behavior from what is known: how subjects that were exposed to advertisements acted, and how subjects that were not exposed to the advertisements acted.

In addition, each subject is different, and may have other inherent characteristics, or features, that make the desired behavior more or less likely. For example, each subject shown in FIG. 2 is associated with various features. These features can describe the subject, or actions taken by the subject. For example, Subject A 202 has features 214 including that Subject A uses the web browser Firefox™, that Subject A spends two hours a day on average on the Internet, that Subject A had viewed the advertiser's website four times in the past week before seeing the advertisement for the advertiser's new car, and that Subject A's language is English. Subjects B 204 and C 206 also have features 216 and 218 that similarly describe the subjects and their actions.

It can be difficult to tell whether a subject performing the desired action (searching for the car) is due to the subject being exposed to the advertisement, or due to other features of the subject. For example, subjects who had already visited the advertiser's website may be more likely than subjects who had not already visited the advertiser's website to search for the advertiser's new car in the future.

To address these issues, the analysis system 302 applies statistical models to statistically account for what causes subjects to act the way they do, as well as differences in features between subjects who were exposed to the advertisement, and subjects who were not exposed to the advertisement. The system 302 verifies whether the observed effects are statistically significant.

§2.2 Example Operating Environment of an Advertising Analysis System

FIG. 3 is a block diagram of an example environment 300 in which observational analysis of the effect of advertisements is performed by an advertising analysis system 302. A computer network 304, e.g., a local area network (LAN), wide area network (WAN), the Internet, or a combination thereof, connects user devices (e.g., Subject A Device 306a, Subject B Device 306b, and Subject C Device 306c), the analysis system 302, and an advertiser device 308. The network 304 can also connect the user devices 306 to one or more websites (not shown). The websites provide content to subjects, and can include advertisements.

Each user device 306 is an electronic device that is under control of a subject and is capable of requesting and receiving resources over the network 304. Example client devices include personal computers, mobile communication devices, and other devices that can send and receive data over the network 304. Subjects (e.g., Subject A 202, Subject B 204, and Subject C 206) use their devices to perform actions such as navigating to websites, issuing search queries, and viewing advertisements.

The advertiser device 308 is an electronic device that is under control of an advertiser and is capable of requesting advertising management metrics and receiving metrics over the network 304. Example advertiser devices include personal computers, mobile communication devices, and other devices that can send and receive data over the network 304.

The analysis system 302 includes a data management system 310, a group identifier 312, and an advertisement feedback generator 316. The data management system 310 receives details of the actions of the subjects as well as other characteristics of the subjects, and processes the actions to generate subject data 317. The subject data 317 describes features of the subjects. The features include, for example, whether the subject was exposed to the advertisement, and if so, how many times the subject was exposed to the advertisement. A subject is exposed to an advertisement when data for the advertisement is received by the subject's device. As used herein, an advertisement can be either a discrete advertisement, e.g., a particular creative or graphic, or can be any or all advertisements that are part of a particular advertising campaign, e.g., any or all of several advertisements for a particular product or service.

The features also describe the actions of each subject, for example, whether the subject took the action desired by the advertiser (either before or after being exposed to the advertisement). The actions can also include placebo actions for the advertising campaign whose advertisements are being tested. A placebo action is an action that is hypothesized as not being affected by being exposed to an advertisement in an advertising campaign. For example, being exposed to an advertisement about cars should not make subjects more likely to go to a pizza parlor's website. Therefore, going to the pizza parlor's website is a placebo actions for the car advertisement.

Placebo actions for a study can be determined a priori using various techniques. For example, in some implementations, the analysis system 302 maintains a list of placebo actions that are used for analyzing all advertisements and advertising campaigns. This list can include actions that are not expected to be influenced by viewing advertisements. For example, actions that are commonly taken by users, such as visiting websites corresponding to search engines or social networking sites are less likely to be influenced by viewing an advertisement. As another example, actions that correspond to visiting web sites that attract different demographics, can be selected as placebo actions. In some implementations, the analysis system 302 selects a large number of placebo actions, because having many placebo actions reduces the impact on the analysis resulting from incorrectly labeling an action as a placebo action. In some implementations, the system uses different lists for different countries, regions, or languages.

In some implementations, the analysis system 302 selects placebo actions for a particular advertisement according to a taxonomy that classifies actions into categories. First, a category for the advertisement is identified. For example, an advertiser can specify a category for the advertisement. The analysis system 302 then selects placebo actions that are in categories other than the category identified for the advertisement. For example, placebo actions in different categories can be selected at random. Alternatively or additionally, the analysis system 302 can select placebo actions for a particular advertisement according to a taxonomy that classifies advertisers. The analysis system 302 can select advertisers that are in different categories than the advertiser whose advertisement is being analyzed, and use desired actions specified by those advertisers as placebo actions.

In some implementations, the analysis system 302 also includes advertising-specific placebo actions that are manually specified, for example, by the advertiser or a user performing the analysis. For example, navigations to websites or searches for terms that are believed to be completely unrelated to the advertisement (e.g., a search for "cars" when the advertisement is about "food") can be identified as placebo actions.

In some implementations, the analysis system 302 uses a classifier built using machine learning techniques to decide whether an action is a placebo action. The classifier takes a candidate action and an advertisement, or advertisement category, as input and determines whether the candidate action should be used as a placebo action for the advertisement, or advertisement category. The classifier can be trained using conventional machine learning techniques on data specifying whether an action is or is not a good placebo action for a given advertisement or advertisement category. The data can be the result of expert analysis of advertisements and actions. Alternatively, or additionally, the data can be data from previous advertising studies. This data can specify that an action is a good placebo action for an advertisement or advertisement category when a test statistic for the action, e.g., an estimate of the effect that the advertisement, or an advertisement in the advertisement category, had on the action, is low. In some implementations, the analysis system 302 uses a different classifier for each category of advertisement.

In some implementations, the analysis system 302 uses a classifier that determines whether a particular candidate action should be used for an advertisement associated with a particular advertiser, or category of advertiser. The classifier can be trained using similar data as what is described above, except that rather than specifying individual advertisements or advertisement categories, the data specifies individual advertisers or advertiser categories. In some implementations, the analysis system 302 uses a different classifier for each category of advertiser.

In some implementations, a group of candidate placebo actions generated using one or more of the techniques described above is tested in multiple studies of different advertisements. After the subject data for the studies is collected, the placebo actions can be filtered so that the remaining placebo actions are not correlated to each other. In some implementations, a manual review of placebo actions is alternatively or additionally performed, during which one or more placebo actions can be removed from the group of placebo actions.

In some implementations, the subject data 317 includes data describing offline actions of users, for example, purchases from physical stores, as well as the online actions of users.

The data management system 310 generates the subject data by processing the details of the actions of the subjects as well as other characteristics of the subjects and extracting the features from the data. The data management system 310 can do additional processing as well. For example, the data management system 310 can determine pseudo-exposure times for control subjects. Since the control subjects were not actually exposed to the advertisement, they do not have an actual exposure time for the advertisement. However, to more easily compare the control subjects to the exposed subjects, the data management system selects a pseudo-exposure time for each control subject. This pseudo-exposure time is a fictional construct that represents the time at which the control subject could have been exposed to the advertisement, but was not. The data management system 310 can determine the pseudo-exposure time for control subjects, for example, by selecting the earliest possible time the subject could have been exposed to the advertisement but was not, e.g., the first time the subject was shown an advertisement. Other examples include randomly selecting a time that the subject could have been exposed to the advertisement but was not, e.g., from the times when the subject was shown an advertisement, or performing a biased-random selection to randomly select a time that the subject could have been exposed to the advertisement but was not, with preference given to earlier pseudo-exposure times.

In some implementations, the subject data 317 is anonymized for privacy protection, so that the subject data is not associated with and does not identify a particular subject. Various anonymization processes, such as hashing, encryption and obfuscation techniques, can be used to ensure that subject privacy is protected.

The group identifier 312 receives the subject data 317 and generates two groups of subject data: the control data 318 and the exposed data 320. The control data 318 and the exposed data 320 are specific to a particular treatment, i.e., are for exposure to a particular advertisement or an advertisement in a particular advertising campaign. The control data 318 is data for control subjects who were not exposed to the treatment (advertisement), and the exposed data 320 is data for exposed subjects who were exposed to the treatment (advertisement).

In some implementations, the group identifier 312 identifies the control subjects and the exposed subjects as follows. The group identifier 312 first identifies the control subjects as all subjects who were not exposed to the advertisement, and the exposed subjects as all subjects who were exposed to the advertisement. The group identifier 312 can identify control and exposed subjects based on whether the subjects were ever exposed to the advertisement, or can identify control and exposed subjects based on whether they were exposed to the advertisement during a window of time that is of interest to the advertiser. Example windows of time are the first 30 days of an advertising campaign, or the last 30 days of an advertising campaign. The group identifier 312 then filters the subjects. For example, the group identifier 312 can filter out subjects from both groups who were not targeted by the advertisement campaign, for example, because they are not located in a country or a region of a country targeted by the campaign. The group identifier 312 can also filter out subjects from both groups who are identified as non-legitimate subjects. A non-legitimate subject is a subject whose actions are abnormal with respect to the typical actions for subjects. An example non-legitimate subject is someone who submits spam, e.g., who submits searches and visits websites in an attempt to provide inaccurate data to a system. The group identifier 312 can also filter out, for example, subjects who were exposed to other advertisements for the same advertiser in the same media as the advertisement (e.g., online advertisements or online advertisements provided through the same advertisement service provider).

The advertisement feedback generator 316 receives requests from the advertising device 308 for advertising statistics. The advertisement feedback generator 316 generates these statistics using one or more statistical models, and sends the requested statistics through the network 304 to the advertiser device 308.

The advertising feedback generator 316 can calculate one or more test statistics for each action that is specified by the advertiser as being a desired action. The advertising feedback generator 316 can generate the test statistics, for example, using the system 100 described above with reference to FIG. 1. The system used by the advertising feedback generator can also generate data describing the test statistics, for example, an estimate of the statistical significance of the test statistics. The data describing the statistical significance of the test statistics can help an advertiser to determine the effectiveness of a given advertising campaign.

The advertising feedback generator 316 determines the statistical significance of a test statistic for a desired action by comparing the test statistic to test statistics for one or more placebo actions. Techniques for determining the statistical significance of a test statistic are described in more detail below with reference to FIG. 4.

The advertising analysis system 302 is just one example analysis system in which the system 100 can be used. The system 100 can also be used in a variety of other analysis systems, for example, behavior analysis and medical analysis systems.

Figure 4:
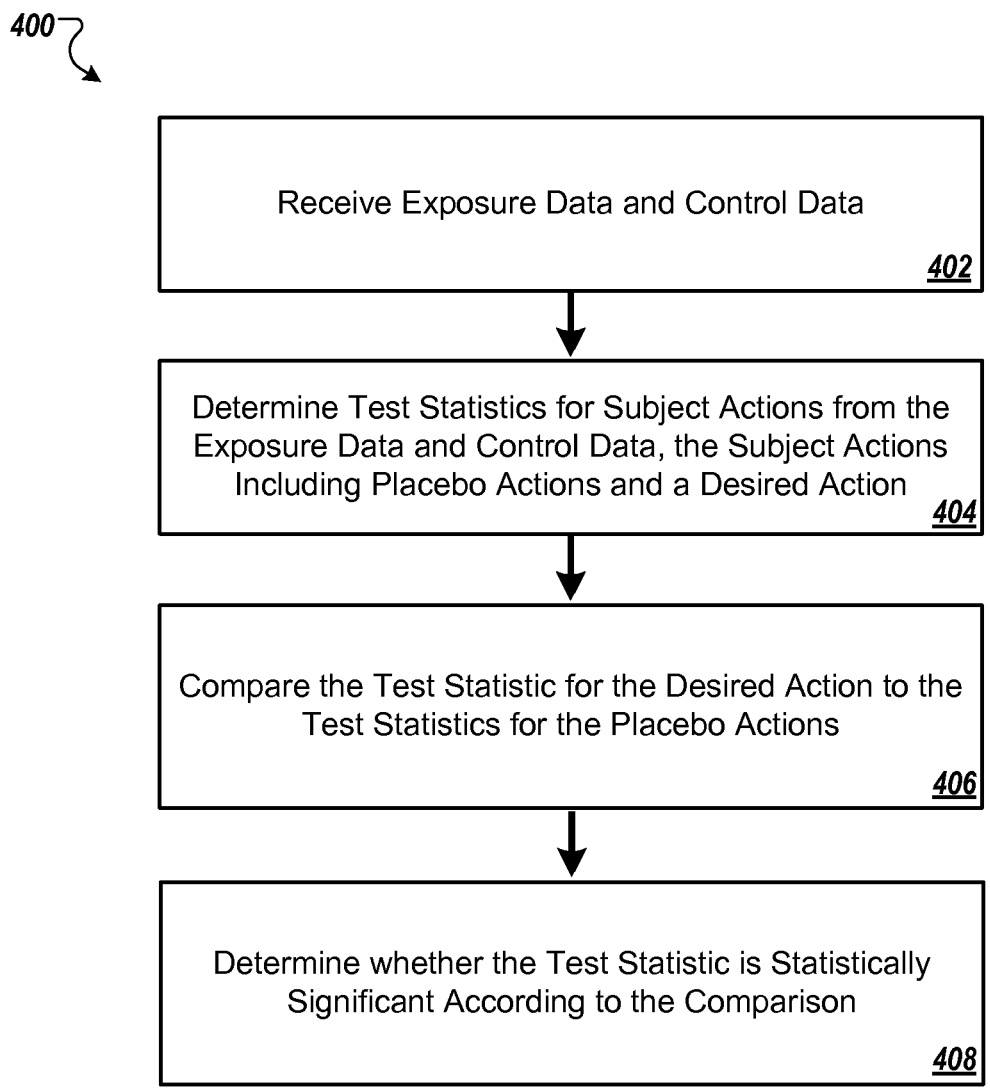
FIG. 4 is a flow diagram of an example process for determining the statistical significance of a test statistic.

§3.0 Example Process for Determining the Statistical Significance of a Test Statistic FIG. 4 is a flow diagram of an example process 400 for determining the statistical significance of a test statistic. The process 400 can be implemented, for example, by the system 100, described above with reference to FIG. 1.

The process 400 receives exposure data and control data (402). The exposure data includes values for features describing actions taken by subjects that were exposed to a particular treatment, and the control data includes values for features describing actions taken by control subjects that were not exposed to a particular treatment. The data can also describe values for features describing characteristics of the subjects. Example features for subjects are described above with reference to FIGS. 1 and 3.

The process 400 determines test statistics for actions from the exposure data and the control data (404). The actions include a desired action and a plurality of placebo actions. Example desired and placebo actions are described above with reference to FIGS. 1 and 3.

The test statistic for each action is derived from an estimated effect that exposure to a treatment has on the particular action. The test statistic for each action is derived from one or more models that are used to estimate the effect that exposure to a treatment has on the action.

For example, the process 400 can generate a control outcome model, an exposed outcome model, and a propensity model for a given action using conventional methods. The control outcome model estimates, for a given control subject, a probability that the subject would take an action of interest, given selected features of the subject. The exposed outcome model similarly estimates, for a given exposed subject, a probability that the subject would take the action of interest given the selected features of the subject. The propensity model estimates, for a given subject, a probability that the subject would be exposed to the treatment, given selected features of the subject.

The process 400 then uses the control outcome model, exposed outcome model, and propensity model to generate an estimate of an increase in the likelihood that subjects exposed to the treatment will take the given action as a result of being exposed to the treatment. Various techniques for determining the estimate can be used. In some implementations, the process 400 generates a regression estimate. The regression estimate is the sum of the difference between the likelihood estimated by the exposed outcome model and the likelihood estimated by the control outcome model for each exposed subject, divided by the number of exposed subjects. For example, the process 400 can generate the regression estimate according to the following formula:

$$\text{likelihood effect} = \frac{\sum_{i \in \text{exposed group}} (m_1(X_i) - m_0(X_i))}{N_E},$$

where $m_1(X_i)$ is the result of the exposed outcome model $m_1$ applied to features $X_i$ of the ith treatment subject, $m_0(X_i)$ is the result of the control outcome model $m_0$ applied to features $X_i$ of the ith treatment subject, and $N_E$ is the number of exposed subjects.

In other implementations, the process 400 generates a propensity estimate. The propensity estimate is the difference in the mean number of exposed subjects who took the given action and the mean weighted number of control subjects who took the given action. The weights for the control group subjects are determined according to the outcome of the propensity model for each control subject. For example, the process 400 can generate a propensity estimate according to the following formula:

$$\text{likelihood effect} = \frac{\sum_{i \in \text{exposed group}} Y_i}{N_E} - \frac{\sum_{i \in \text{control group}} \left(\frac{p_i}{1-p_i}\right) Y_i}{\sum_{i \in \text{control group}} \left(\frac{p_i}{1-p_i}\right)},$$

where $Y_i$ is 1 if subject i took the desired action and is 0 otherwise, $p_i$ is the value returned from the propensity model for subject i, and $N_E$ is the number of exposed subjects. Alternatively, the process 400 can stratify the treatment subjects and the control subjects into several groups, e.g., according to their propensity scores, and then take the average of the within-stratum differences of the means of the treatment subjects and the control subjects.

In still other implementations, the process 400 generates a double robust estimate. The double robust estimate adjusts the propensity estimate according to outcomes from the control and exposed outcome models. For example, the process 400 can calculate a double robust estimate according to the following formula:

$$\text{likelihood effect} = \left(\frac{\sum_{i \in \text{exposed group}} Y_i - \sum_{i \in \text{control group}} \left(\frac{p_i}{1-p_i}\right) Y_i}{\sum_{i \in \text{everyone}} p_i}\right) - \left(\frac{\sum_{i \in \text{everyone}} (Z_i - p_i) m_1(X_i) + \sum_{i \in \text{everyone}} \left(\frac{p_i}{1-p_i}\right)(Z_i - p_i) m_0(X_i)}{\sum_{i \in \text{everyone}} p_i}\right),$$

where $Y_i$ is 1 if subject i took the desired action and is 0 otherwise, $p_i$ is the value returned from the propensity model for subject i, $m_1(X_i)$ is the result of the exposed outcome model $m_1$ applied to features $X_i$ of the ith subject, $m_0(X_i)$ is the result of the control outcome model $m_0$ applied to features $X_i$ of the ith subject, and is 1 if subject i is in the exposed group and 0 if subject i is in the control group.

The process 400 generates the test statistic from the estimated increase in likelihood. For example, the test statistic can be the estimated increase in likelihood itself, or the estimated increase in likelihood divided by the standard error of the estimate.

In other implementations, other models and other estimates of likelihood can be used to generate the test statistics. For example, in some implementations, the exposed and control models can be combined, with exposed and control subjects distinguished by one or more features considered by the combined model.

The process 400 compares the test statistic for the desired action to the test statistics for the placebo actions (406). In general, the comparison estimates how likely it is that the increase in likelihood indicated by the test statistic is due to chance alone. The comparison determines how likely it is that a test statistic selected at random from the test statistics for the placebo actions and the test statistic for the desired actions will be greater than or equal to the test statistic for the desired action.

Figure 5:
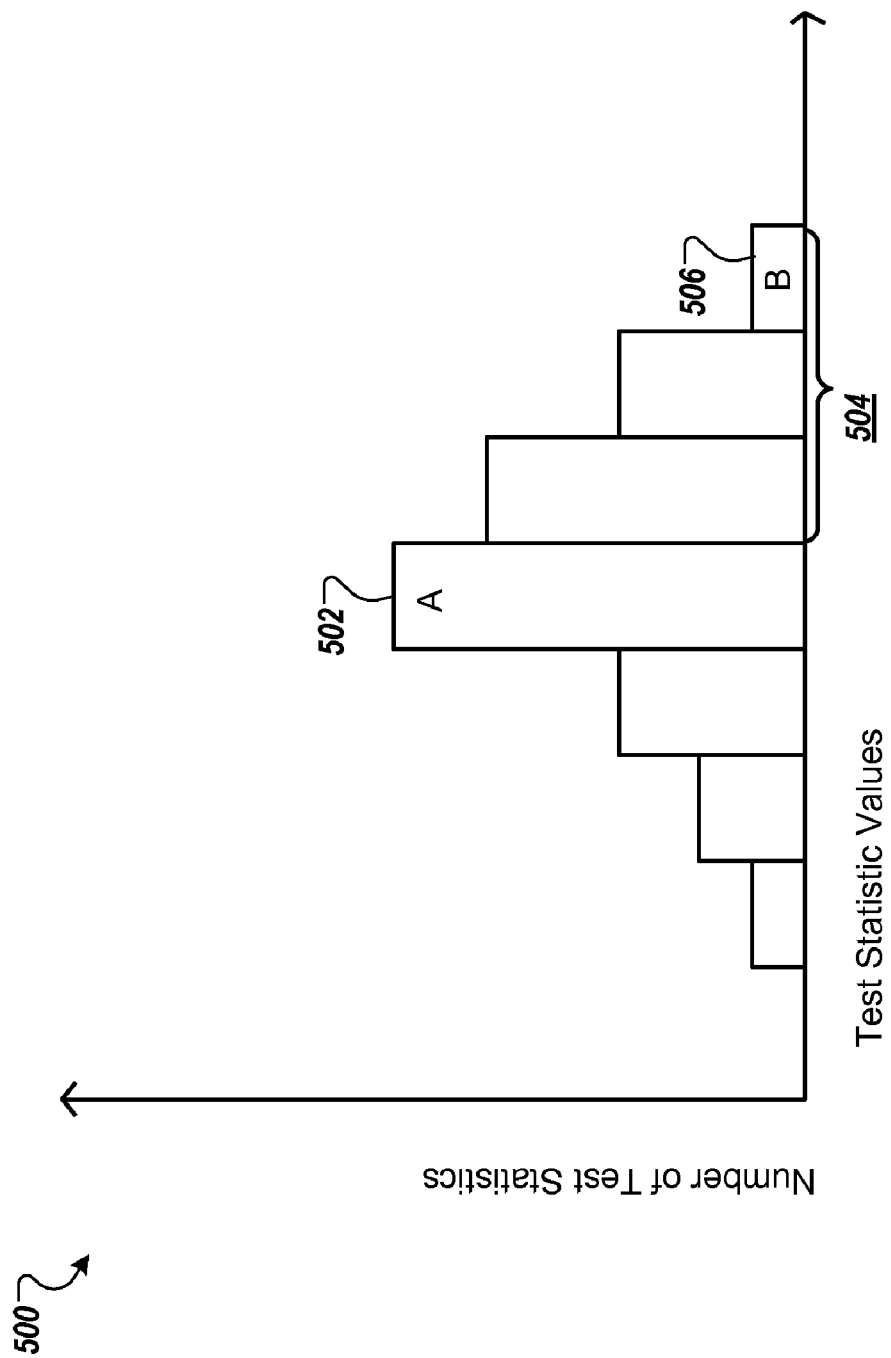
FIG. 5 is a histogram illustrating the distribution of example test statistics for a desired action and several placebo actions.

FIG. 5 is a histogram illustrating the distribution of example test statistics for a desired action and several placebo actions. The histogram includes seven bins, each corresponding to a respective range of test statistics. The x-axis of the histogram 500 indicates test statistic values, and the y-axis of the histogram 500 indicates the number of test statistics in each bin.

The particular bin into which the test statistic for the desired action falls indicates how likely it is that the increase in the desired action indicated by the test statistic is due to pure chance. The more bins to the right of the desired action test statistic (and thus the more placebo test statistics whose values are higher than the desired action test statistic), the less likely the increase shown by the test statistic is due to pure chance. For example, if the test statistic for the desired action falls in bin A 502 on the histogram, there are many test statistics for placebo actions that are greater than the test statistic for the desired action, i.e., the test statistics in region 504. Therefore, there are many placebo test statistics that are greater than the desired action test statistic, and it is more likely that the desired action test statistic is just due to noise in the data. However, if the test statistic for the desired action falls in bin B 506 on the histogram, there are few test statistics for placebo actions that are greater than the test statistic for the desired action. Therefore, it is more likely that the increase indicated by the desired action test statistic is caused by something other than chance or noise in the data, and therefore the test statistic may be statistically significant.

Returning to FIG. 4, in some implementations, the process 400 performs the comparison by generating a probability score for the test statistic for a desired action from the test statistics. The probability score, or p-value, estimates the probability that a placebo test statistic randomly selected from a population corresponding to the placebo test statistics will be at least as large as the test statistic for the desired action. The population corresponding to the placebo test statistics is a population of test statistics with the same characteristics as the placebo test statistics. Example characteristics include mean, standard deviation, and skewness. For example, the population can be the actual placebo test statistics, or a population comprising test statistics that are not identical to the placebo test statistics, but that have the same overall characteristics as the placebo test statistics.

The probability score can be calculated using various techniques. In some implementations, the probability distribution is determined as follows. First, the process 400 counts the number of placebo test statistics that are greater than or equal to the test statistic for the desired action. Then, the process 400 divides one plus that number by the total number of test statistics for the desired action and the placebo actions. The resulting quotient is the probability score.

For example, if there are K placebo actions and one desired action, the probability is $$\frac{1}{K+1}$$

if the test statistic for the desired action is the largest of all of the test statistics, the probability is $$\frac{2}{K+1}$$

if the test statistic for the desired action is the second largest of all of the test statistics, and more generally $$\frac{k}{K+1}$$

if the test statistic for the desired action is the kth largest of the test statistics.

In some implementations, the process 400 interpolates between two possible probability scores for the desired test statistic. For example, if the desired test statistic falls between the jth largest and the j+1th largest placebo test statistics, the system can interpolate between probability scores of the two placebo test statistics. The probability score for a given placebo test statistic estimates the likelihood that a test statistic randomly selected from a population corresponding to the placebo test statistics is at least as large as the given placebo test statistic. For example, in this case, the probability scores are $$\frac{j+1}{K+1} \text{ and } \frac{j+2}{K+1}.$$

The interpolated probability can be determined according to the following formula:

$$\text{interpolated\_prob} = prob_j + \frac{prob_{j+1} - prob_j}{statistic_{j+1} - statistic_j} \times (statistic_{desired} - statistic_j),$$

where $statistic_j$ is the jth largest placebo test statistic, $prob_j$ is the probability score for the jth largest placebo test statistic, $statistic_{j+1}$ is the j+1th largest placebo test statistic, $prob_{j+1}$ is the probability score for the j+1th largest placebo test statistic, and $statistic_{desired}$ is the test statistic for the desired action.

For example, if the desired test statistic is 3.7, and it falls between the second largest placebo test statistic of 4 and the third largest placebo test statistic of 3.5, and there are K=9 placebo test statistics, the process 400 determines the appropriate probability score as follows. First, the process 400 determines a probability score for each of the placebo test statistics. The second largest test statistic has a probability score of 2/10=0.2, and the third largest test statistic has a probability score of 3/10=0.3. The process 400 then interpolates between two points corresponding to the probability score and the placebo test statistic for each of the placebo test statistics. These points are $(statistic_j, prob_j)=(4, 0.2)$ and $(statistic_{j+1}, prob_{j+1})=(3.5, 0.3)$. The process 400 then applies the formula given above to these values:

$$\text{interpolated\_prob} = 0.2 + \frac{0.3 - 0.2}{4 - 3.5} \times (3.7 - 4) = 0.26.$$

In some implementations, the process 400 only interpolates probability scores when at least one placebo test statistic is greater than the test statistic for the desired action. Otherwise, the probability score for the test statistic for the desired action is $$\frac{1}{K+1},$$

regardless of how much larger it is than any of the placebo test statistics.

In some implementations, the process 400 interpolates between the possible probabilities using linear interpolation, for example, as described above. In other implementations, the process 400 interpolates between the probabilities by transforming the potential probability scores from an original scale to a reference scale, e.g., a normal distribution scale, linearly interpolating the transformed probability scores, and then transforming the interpolated probability scores back to the original scale. The transformation from the original scale to a normal distribution scale can be performed, for example using an inverse normal cumulative distribution function.

Other approaches for calculating the probability score from the test statistics for placebo actions can also be used. For example, the process 400 can calculate the probability score by calculating a p-value for the test statistic using a distribution based on various characteristics of the placebo test statistics, but not necessarily corresponding to the actual distribution of the placebo test statistics. Various distributions, for example, a normal distribution, a gamma distribution, or other parametric distributions can be used. Characteristics appropriate to the distributions, for example, mean, standard deviation, or skewness, can also be used.

In other implementations, the process 400 directly compares the test statistic for the desired action to the distribution test statistics for the placebo actions by determining what percentile of the distribution of test statistics for the placebo actions that the test statistic for the desired action falls in. The process 400 can use the actual distribution or a distribution fitted to the placebo test statistics according to characteristics of the placebo test statistics, e.g., mean, standard deviation, and skewness. For example, a normal distribution, a gamma distribution, or other parameteric distributions can be used.

In other implementations, the process 400 calculates a nonparametric estimate of the density of the test statistics for the placebo actions and determines the percentile of the density into which the test statistic for the desired action falls.

The process 400 determines whether the test statistic is statistically significant according to the comparison (408). In some implementations, the process 400 compares a result of the comparison to a threshold value. If the result satisfies the threshold, the process 400 determines that the test statistic is statistically significant.

In some implementations, the threshold is determined from an acceptable false alarm probability $\alpha$. The false alarm probability $\alpha$ is a pre-determined probability with which it is acceptable for the system to incorrectly label a non-statistically significant test result as a statistically significant test result. The value of $\alpha$ can be an internal parameter of the system executing the process 400, or can be determined by someone external to the system who will receive the results of the process 400. For example, the value of can be determined by an advertiser whose advertisements are being tested. Example alpha values are 0.05 and 0.1, indicating a 5% acceptable false alarm rate and a 10% acceptable false alarm rate, respectively.

If the result of the comparison is a probability score, the process 400 can use the false alarm probability $\alpha$ as the threshold. If the probability score is less than $\alpha$, the process 400 rejects the null hypothesis and determines that the test statistic is statistically significant. If the result of the comparison is a percentile of the distribution, the process 400 can use 1-$\alpha$ as the threshold. If the test statistic for the desired action falls into a percentile that is greater than 1-$\alpha$, the process 400 rejects the null hypothesis and determines that the test statistic is statistically significant.

Figure 6:
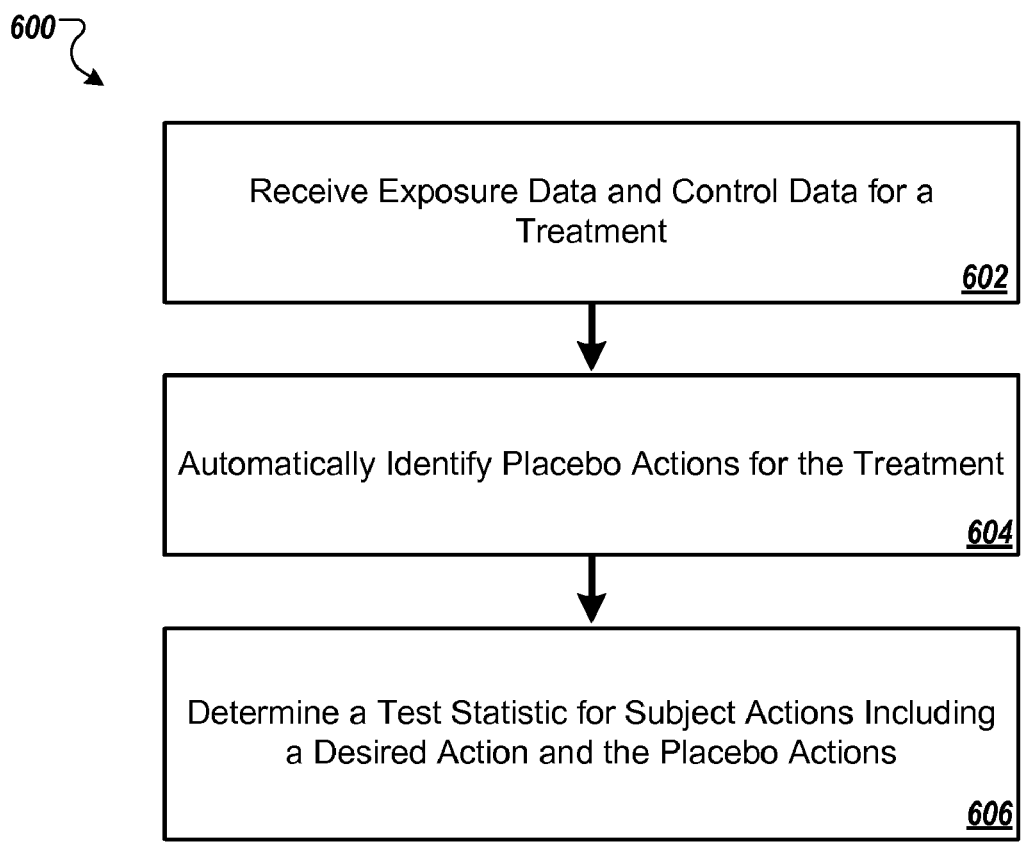
FIG. 6 is a flow diagram of an example process for identifying placebo actions and determining test statistics for the placebo actions.

FIG. 6 is a flow diagram of an example process 600 for identifying placebo actions and determining test statistics for the placebo actions. The process 600 can be implemented, for example, by the system 100, described above with reference to FIG. 1.

The process 600 receives exposure data and control data for a treatment (602), for example, as described above with reference to FIG. 4. The process 600 automatically identifies placebo actions for the treatment (604). In some implementations, the process 600 identifies the placebo actions using a taxonomy that classifies subject actions, treatments, or both.

In some implementations, the taxonomy categorizes subject actions and the process 600 selects placebo actions that have a different classification than a desired action for the treatment. The placebo actions can be selected from the different classifications, for example, at random. An example of selecting placebo actions for advertisements in this manner is described above with reference to FIG. 3. However, other (non-advertising) actions can similarly be categorized and selected. For example, if an experiment is testing the effect of a new medication on user health, various health indications can be classified, and selected as placebo actions according to the classifications.

In some implementations, the taxonomy categorizes treatments and the process 600 selects desired actions for treatments that have a different classification than the treatment being tested. The treatments can be selected from the different classifications, for example, at random. A desired action for a treatment is an action that is hypothesized to be possibly affected by the treatment. Desired actions can be specified, for example, by the party conducting the test or the party on whose behalf the test is being conducted. An example of selecting placebo actions by identifying differently classified treatments and their desired actions in the context of advertising is described above with reference to FIG. 3. However, other treatments can similarly be associated with desired actions, categorized, and selected.

In some implementations, the process 600 uses a machine-learning trained classifier to select placebo actions from candidate actions. The candidate actions can be, for example, actions on a predetermined list of actions. The classifier can be trained to determine whether a candidate action is a placebo action for the treatment or not a placebo action for the treatment, based, at least in part, on the classification of one or more of the desired action and the treatment according to the taxonomy. For example, the classifier can be a classification specific classifier or can be a general classifier that receives the classification of the desired action or the classification of the treatment as input. The classifier can also be specific to the source of the treatment, or specific to a classification of the source of the treatment. The source of the treatment is where the treatment originated; for example, the source of an advertising treatment is advertiser. Example classifiers for placebo actions for advertising studies are described above with reference to FIG. 3. Other similar classifiers could be used for other types of studies.

In some implementations, the process 600, or another process, trains the classifier using training data identifying actions that are placebo actions for a particular classification of treatment or desired action and actions that are not placebo actions for a particular classification of treatment or desired action. The training data can be data resulting from human analysis of treatments and actions or from an analysis of test statistics from prior studies, for example, as described above with reference to FIG. 3.

Other methods of automatically identifying placebo actions, for example, using a pre-defined list of placebo actions for all treatments for a given country, region, or language, can also be used.

The process 600 determines a test statistic for subject actions including a desired action and the identified placebo actions (606). The process can determine the test statistics, for example, as described above with reference to FIG. 4.

In some implementations, the process 600 further filters out one or more of the placebo actions before determining the test statistics. For example, the process 600 can analyze the placebo actions and filter out placebo actions that appear to be correlated, as described above with reference to FIG. 3.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:

receiving, at data processing apparatus, exposure data and control data, the exposure data describing exposed subjects and the control data describing control subjects, each of the exposed subjects being a subject that was exposed to a treatment, and each of the control subjects being a subject that was not exposed to the treatment, wherein the exposure data includes values for a plurality of features for each exposed subject, the plurality of features for each exposed subject including features describing actions taken by the exposed subject, and wherein the control data includes values for a plurality of features for each control subject, the plurality of features for each control subject including features describing actions taken by the control subject;

determining, from the exposure data and the control data, a test statistic for each of a plurality of subject actions including a desired action and a plurality of placebo actions, wherein the desired action is an action that is hypothesized to be possibly affected by the treatment and each placebo action is an action that is hypothesized to be unaffected by the treatment, and wherein the test statistic for an action corresponds to an estimated effect that exposure to the treatment has on a likelihood that a subject will take the action;

comparing, in the data processing apparatus, the test statistic for the desired action to the test statistics for the plurality of placebo actions; and determining, in the data processing apparatus, whether the test statistic for the desired action is statistically significant according to the comparison.

2. The method of claim 1, wherein comparing the test statistic for the desired action to the test statistics for the plurality of placebo actions comprises generating a probability score for the desired action, wherein the probability score estimates the probability that a test statistic randomly selected from the a population corresponding to the test statistics for the placebo actions is greater than or equal to the test statistic for the desired action, the method further comprising determining whether the test statistic for the desired action is statistically significant according to the probability score.

3. The method of claim 2, wherein calculating the probability score comprises dividing a number of test statistics for the desired action and the placebo actions that are greater than or equal to the test statistic for the desired action by a total number of test statistics for the desired action and the placebo actions.

4. The method of claim 2, wherein calculating the probability score comprises interpolating between a first probability score for a test statistic for a placebo action that is less than the test statistic for the desired action and a second probability score for a test statistic for a placebo action that is greater than the test statistic for the desired action.

5. The method of claim 4, further comprising transforming the first probability score and the second probability score to a reference distribution scale before performing the interpolation.

6. The method of claim 5, wherein the reference distribution scale is a normal distribution scale.

7. The method of claim 2, wherein calculating the probability score comprises fitting a statistical distribution to the test statistics for the placebo actions and calculating the probability score from the fitted distribution.

8. The method of claim 2, wherein determining whether the test statistic for the desired action is statistically significant according to the probability score comprises comparing the probability score to a threshold.

9. The method of claim 8, wherein the threshold is derived from a specified acceptable false alarm rate.

10. The method of claim 1, wherein a test statistic for an action is the estimated increase in the action caused by the treatment divided by the standard error of the estimated increase.

11. The method of claim 1, wherein the treatment is being exposed to an advertisement in an advertising campaign of an advertiser.

12. The method of claim 11, wherein the desired action is one of a navigation to a web page associated with the advertiser, a submission of a search query including a search term associated with the advertiser, and an action identified by the advertiser as a conversion.

13. The method of claim 11, wherein the desired action is an offline action.

14. The method of claim 1, further comprising selecting the plurality of placebo actions from a plurality of candidate actions.

15. A system, comprising: a processor; and a non-transitory computer storage medium coupled to the processor and including instructions, which, when executed by the processor, causes the processor to perform operations comprising: receiving, at data processing apparatus, exposure data and control data, the exposure data describing exposed subjects and the control data describing control subjects, each of the exposed subjects being a subject that was exposed to a treatment, and each of the control subjects being a subject that was not exposed to the treatment, wherein the exposure data includes values for a plurality of features for each exposed subject, the plurality of features for each exposed subject including features describing actions taken by the exposed subject, and wherein the control data includes values for a plurality of features for each control subject, the plurality of features for each control subject including features describing actions taken by the control subject; determining, from the exposure data and the control data, a test statistic for each of a plurality of subject actions including a desired action and a plurality of placebo actions, wherein the desired action is an action that is hypo-thesized to be possibly affected by the treatment and each placebo action is an action that is hypothesized to be unaffected by the treatment, and wherein the test statistic for an action corresponds to an estimated effect that exposure to the treatment has on a likelihood that a subject will take the action; comparing, in the data processing apparatus, the test statistic for the desired action to the test statistics for the plurality of placebo actions; and determining, in the data processing apparatus, whether the test statistic for the desired action is statistically significant according to the comparison.

16. The system of claim 15, wherein comparing the test statistic for the desired action to the test statistics for the plurality of placebo actions comprises generating a probability score for the desired action, wherein the probability score is the probability that a test statistic randomly selected from a population corresponding to the test statistics for the placebo actions and the test statistic for the desired action is greater than or equal to the test statistic for the desired action, the method further comprising determining whether the test statistic for the desired action is statistically significant according to the probability score.

17. The system of claim 16, wherein calculating the probability score comprises dividing a number of test statistics for the desired action and the placebo actions that are greater than or equal to the test statistic for the desired action by a total number of test statistics for the desired action and the placebo actions.

18. The system of claim 16, wherein calculating the probability score comprises interpolating between a first probability score for a test statistic for a placebo action that is less than the test statistic for the desired action and a second probability score for a test statistic for a placebo action that is greater than the test statistic for the desired action.

19. The system of claim 18, further operable to perform operations comprising transforming the first probability score and the second probability score before performing the interpolation.

20. The system of claim 19, wherein the reference distribution scale is a normal distribution scale.

21. The system of claim 16, wherein calculating the probability score comprises fitting a statistical distribution to the test statistics for the placebo actions and calculating the probability score from the fitted distribution.

22. The system of claim 16, wherein determining whether the test statistic for the desired action is statistically significant according to the probability score comprises comparing the probability score to a threshold.

23. The system of claim 22, wherein the threshold is derived from a specified acceptable false alarm rate.

24. The system of claim 15, wherein a test statistic for an action is the estimated increase in the action caused by the treatment divided by the standard error of the estimated increase.

25. The system of claim 15, wherein the treatment is being exposed to an advertisement in an advertising campaign of an advertiser.

26. The system of claim 25, wherein the desired action is one of a navigation to a web page associated with the advertiser, a submission of a search query including a search term associated with the advertiser, and an action identified by the advertiser as a conversion.

27. The system of claim 25, wherein the desired action is an offline action.

28. The system of claim 15, further operable to perform operations comprising selecting the plurality of placebo actions from a plurality of candidate actions.

29. A non-transitory computer storage medium encoded with a computer program, the computer program comprising instructions that, when executed by data processing apparatus, cause the data processing apparatus to perform operations comprising: receiving, at data processing apparatus, exposure data and control data, the exposure data describing exposed subjects and the control data describing control subjects, each of the exposed subjects being a subject that was exposed to a treatment, and each of the control subjects being a subject that was not exposed to the treatment, wherein the exposure data includes values for a plurality of features for each exposed subject, the plurality of features for each exposed subject including features describing actions taken by the exposed subject, and wherein the control data includes values for a plurality of features for each control subject, the plurality of features for each control subject including features describing actions taken by the control subject; determining, from the exposure data and the control data, a test statistic for each of a plurality of subject actions including a desired action and a plurality of placebo actions, wherein the desired action is an action that is hypothesized to be possibly affected by the treatment and each placebo action is an action that is hypothesized to be unaffected by the treatment, and wherein the test statistic for an action corresponds to an estimated effect that exposure to the treatment has on a likeli-hood that a subject will take the action; comparing, in the data processing apparatus, the test statistic for the desired action to the test statistics for the plurality of placebo actions; and determining, in the data processing apparatus, whether the test statistic for the desired action is statistically significant according to the comparison.

30. A computer-implemented method, comprising:
    receiving, at data processing apparatus, exposure data and control data, the exposure data describing exposed subjects and the control data describing control subjects, each of the exposed subjects being a subject that was exposed to a first treatment, and each of the control subjects being a subject that was not exposed to the first treatment, wherein the exposure data includes values for a plurality of features for each exposed subject, the plurality of features for each exposed subject including features describing actions taken by the exposed subject, and wherein the control data includes values for a plurality of features for each control subject, the plurality of features for each control subject including features describing actions taken by the control subject;

automatically identifying, with the data processing apparatus, a plurality of placebo actions for the first treatment, wherein each placebo action is an action that is hypothesized to be unaffected by the first treatment, wherein the identifying includes using a taxonomy that classifies one or more of subject actions and treatments; and determining, with the data processing apparatus, from the exposure data and the control data, a test statistic for each of a plurality of subject actions including a desired action and the plurality of placebo actions, wherein the desired action is an action that is hypothesized to be possibly affected by the first treatment, and wherein the test statistic for an action corresponds to an estimated effect that exposure to the first treatment has on a likelihood that a subject will take the action.

31. The method of claim 30, wherein the taxonomy classifies subject actions, and automatically identifying a plurality of placebo actions includes selecting subject actions that have a different classification than the desired action according to the taxonomy.

32. The method of claim 31, wherein the placebo actions are selected at random from actions that have a different classification than the desired action according to the taxonomy.

33. The method of claim 30, wherein the taxonomy classifies treatments, and automatically identifying a plurality of placebo actions includes selecting actions associated with treatments that have a different classification than the first treatment according to the taxonomy, wherein the actions associated with the treatments are actions that are hypothesized to be possibly affected by the treatments.

34. The method of claim 33, wherein the placebo treatments are selected at random from treatments that have a different classification than the first treatment according to the taxonomy.

35. The method of claim 30, further comprising filtering out one or more of the identified placebo actions before determining the test statistics for the placebo actions.

36. The method of claim 30, wherein identifying the plurality of placebo actions comprises applying a machine-learning trained classifier to a plurality of candidate actions, wherein the machine-learning trained classifier classifies a candidate action as a placebo action or as not a placebo action for the first treatment based, at least in part, on one or more of a classification of the desired action according to the taxonomy and a classification of the first treatment according to the taxonomy.

37. The method of claim 36, further comprising training the classifier using training data identifying a plurality of first actions that should be selected as placebo actions for each of one or more treatments and a plurality of second actions that should not be selected as placebo actions for each of one or more treatments.

38. The method of claim 37, wherein the training data is data resulting from human analysis of treatments and actions.

39. The method of claim 37, wherein the training data is data resulting from prior studies.

40. The method of claim 36, wherein the classifier is specific to one of a source of the first treatment, a classification of the first treatment, or a classification of the source of the first treatment.

* * * * *

UNITED STATES PATENT AND TRADEMARK OFFICE
CERTIFICATE OF CORRECTION

PATENT NO. : 8,346,710 B2  
APPLICATION NO. : 12/696921  
DATED : January 1, 2013  
INVENTOR(S) : David Xi-Kuan Chan et al.

It is certified that error appears in the above-identified patent and that said Letters Patent is hereby corrected as shown below:

Claim 2, Column 20, Line 23 – delete "the a" insert -- the --, therefor.

Claim 15, Column 21, Line 26 – delete "hypo-thesized" insert -- hypothesized --, therefor.

Claim 29, Column 22, Line 50 – delete "likely-hood" insert -- likelihood --, therefor.

Signed and Sealed this  
Nineteenth Day of March, 2013

Teresa Stanek Rea  
*Acting Director of the United States Patent and Trademark Office*